US006271497B1

(12) United States Patent
Zapletal

(10) Patent No.: US 6,271,497 B1
(45) Date of Patent: Aug. 7, 2001

(54) PLASMA TORCH HEAD AND METHOD FOR MAKING THE SAME

(75) Inventor: Jiri Zapletal, Cornish, NH (US)

(73) Assignee: Tatras, Inc., Claremont, NH (US)

(*) Notice: Subject to any disclaimer, the term of this patent is extended or adjusted under 35 U.S.C. 154(b) by 0 days.

(21) Appl. No.: 09/288,904

(22) Filed: Apr. 9, 1999

(51) Int. Cl.[7] ........ B23K 9/00
(52) U.S. Cl. ........ 219/121.36; 219/137.31
(58) Field of Search ........ 219/121.36, 137.31, 219/121.59, 121.5, 75, 121.48; 427/446; 29/527.3, 558; 164/46.6, 46.8, 516

(56) References Cited

U.S. PATENT DOCUMENTS

| | | | | |
|---|---|---|---|---|
| 3,145,287 | * | 8/1964 | Siebein et al. | 219/75 |
| 3,183,337 | * | 5/1965 | Winzeler et al. | 219/76.16 |
| 3,265,856 | * | 8/1966 | Cecil | 219/137.9 |
| 4,463,245 | * | 7/1984 | McNeil | 219/121.48 |
| 4,788,401 | * | 11/1988 | Kleppen | 219/75 |
| 4,973,816 | * | 11/1990 | Haberman | 219/121.48 |
| 5,519,185 | | 5/1996 | Kleppen | 219/137.31 |

OTHER PUBLICATIONS

PCH/M–35 Smart Torch Instruction Manual, Thermal Dynamics, 1997, pp. 34–35.

* cited by examiner

*Primary Examiner*—Teresa Walberg
*Assistant Examiner*—Quang Van
(74) *Attorney, Agent, or Firm*—Michael J. Weins; Jeffrey E. Semprebon

(57) ABSTRACT

A plasma torch head has transfer components, including an HF lead and a power lead/gas conduit, which are partially encased in a core fabricated from an elastomer. The core is housed in a rigid shell, which preferably also engages a portion of the transfer components. The shell can be a two-piece shell which is assembled around the core, or can be a single piece cast around the core. The core can be fabricated by securing the transfer components in a mold and filling the mold with an elastomer such as liquid silicone rubber. After curing the elastomer in the mold, the core is stripped from the mold and the shell is formed around the core. In one preferred method, sections of a two-part shell are injection molded from phenolic, placed about the core, and secured together with bolts. In another preferred method, the core is placed in a mold and the mold is filled with a liquid two-part epoxy which is cured in a reduced pressure atmosphere to form a one-piece shell.

28 Claims, 6 Drawing Sheets

PLASMA TORCH HEAD AND METHOD FOR MAKING THE SAME

FIELD OF THE INVENTION

The present invention relates to plasma torches, and more particularly to a sloughing and fracture resistant plasma torch head and a method for making the same.

BACKGROUND OF THE INVENTION

Plasma torches are frequently used for welding, hard facing, and cutting metals. These plasma torches have a torch head, to which a torch handle and a set of terminal components such as an electrode, a tip, and a shield cup are attached. The torch head has embedded therein various components for transferring fluids and electrical currents, which include a high frequency (HF) lead and a power lead/gas conduit. The power lead/gas conduit is separated from the HF lead by an insulating member. The torch head is fabricated from an electrically insulating and heat resistant material which is either a phenolic molding material or an elastomer such as a rubber compound. The torch head is typically formed by molding under pressure with the other components embedded therein.

For torch heads formed of heat resistant phenolic molding material, the life of the torch head is typically limited by fracturing of the torch head which is caused by abrasion of the surface in combination with thermal cycling of the torch head during use. To reduce such problems, multi-part torch heads have been fabricated having a core surrounded by a shell. The core segment is fabricated from a thermally stable epoxy or phenolic molding material which has a portion of the transfer components embedded therein. The core segment in turn is housed in a two-part shell cover, fabricated from a heat resistant phenolic molding material, which is fastened around the core segment. The use of a multiple part assembly allows safety switches to readily be incorporated into the torch head. The fabrication of the torch head from a multiple part assembly also reduces the mean thickness of the torch head elements and enhances the life of the torch head by reducing the thermal stresses. While the life of the multi-part torch head is greater than the life of the single part torch head, the resulting torch heads still suffer limited useful lives due to fracturing.

A discussion of the fabrication of torch heads is found in U.S. Pat. No. 5,519,185, which suggests that the use of elastomers for the housing is preferred to extend the usable life of the torch head. The ’185 patent notes that the fabrication of housings from silicone rubber, which is one of the preferred elastomers for heat resistance, is particularly difficult since the flow characteristics of the silicone rubber are poor. The ’185 patent teaches that torch heads formed from silicone rubber are usually formed by wrapping the components to be embedded in the housing with strips of silicone rubber and then pressing the resulting assembly in a mold to obtain the desired shape, with the excess material being squeezed out of the mold leaving a flash which is trimmed away.

It is noted in the ’185 patent that these elastomer materials are subject to deterioration over time due to sloughing, and that this problem can be reduced by employing a three-layer structure having a first layer of a heat resistant elastomer, a second layer of a fibrous heat and abrasion resistant reinforcing material, and a third layer of a heat resistant elastomer. While the resulting structure provides a reduction in sloughing compared to single-layer elastomer torch heads, the improved life is obtained at the expense of complicating an already complex fabrication technique.

Thus, there is a need for a plasma torch head which is readily fabricated and which has a high resistance to damage from cyclic thermal stresses, mechanical wear, sloughing, and fracturing.

OBJECTS OF THE INVENTION

It is an object of the present invention to provide a plasma torch head having improved resistance to sloughing and fracturing.

It is another object of the present invention to provide a plasma torch head having an elastic core surrounded by a rigid shell.

Still another object of the present invention is to provide a plasma torch head having inner transfer components embedded in an elastic material which does not require wrapping of the transfer components during fabrication.

Yet a further object of the present invention is to provide a plasma torch head having an elastic core for embedding the inner transfer components with enhanced resistance to sloughing.

It is an object of the present invention to provide a plasma torch head having a rigid exterior surface with extended surface life.

It is yet another object of the present invention to provide a durable plasma torch head which can be readily fabricated.

It is still another object of the present invention to provide a method for readily fabricating a torch head within improved durability.

It is still another object of the present invention to provide a torch head with improved durability which can incorporate safety switches.

SUMMARY OF THE INVENTION

The present invention is for a plasma torch head which has transfer components which are spaced apart and positioned to partially overlap, providing an overlapping region of the transfer components. The transfer components serve to transfer fluids and currents through the plasma torch head, and preferably include at least one insulating member to assure the electrical isolation of the current carrying transfer components.

A core fabricated from an elastomer is provided, into which a core-supported section of the overlapping region of the transfer components is embedded, while leaving an unsupported section of the overlapping region of the transfer components which extends beyond the core. The elastomer employed is preferably a moldable thermosetting rubber, and more preferably silicone rubber. To simplify fabrication, it is further preferred that a liquid moldable rubber be employed to form the core by injection of the liquid moldable rubber into the mold. Silicone rubbers in liquid form are commercially available from Wacker Silicones Corp. and GE Silicones.

The core of the plasma torch head is housed in a rigid shell. It is preferred that the rigid shell house not only the core, but also a portion of the unsupported section of the overlapping region of the transfer components. It is further preferred for the unsupported section of the overlapping region of the transfer components to be engaged by the rigid shell to provide support to and provide separation of the transfer components.

The shell can be fabricated as a two-piece shell which surrounds the core. The sections of the shell can be fabricated either by casting, in which case it is preferred for a two-part epoxy to be employed, or by molding, in which case it is preferred to employ a phenolic molding material such as Bakelite®.

Alternatively, the shell can be fabricated as a single piece by either injection molding, transfer molding, or by casting the shell around the elastomer core. More preferably, the shell should encase a portion of the unsupported section of the overlapping region of the transfer components. When a single piece shell is employed, it is preferred that the shell be cast from a two-part epoxy.

The plasma torch head of the present invention can be fabricated by various methods. Preferably, the plasma torch head is fabricated from injection molded elements, compression molded elements, cast elements, or a combination thereof. In one method, the core of the plasma torch head is fabricated by compression molding strips of an elastomer which are wrapped about the transfer components, as is discussed in the '185 patent.

The preferred method of fabricating the core is by injection molding. When the core is formed by injection molding, a core injection mold is employed, which is designed to position and hold the transfer components and any insulating members in the appropriate spacial relationship. The transfer components and any insulating members are set in the core injection mold and the mold closed to fixedly position the transfer components and insulating members in the core injection mold. An elastomer, which is preferably a liquid silicone rubber, is injected into the closed core injection mold. Liquid silicone rubbers typically have two components which are mixed on site before injection into the mold.

After injection, the elastomer is cured at a recommended temperature and pressure in the mold to form the core, and the core may be subsequently post-cured at an elevated temperature. The core is then stripped from the mold.

After removal from the core mold, the core is encased in a rigid shell. The shell can be formed in multiple sections which are secured about the core or, alternatively, can be formed around the core as a single piece.

When shell sections are employed, the shell sections can be cast from a two-part epoxy; however, it is preferred to form the shell sections by molding phenolic particles in shell section molds. When the shell sections are assembled about the core, the shell sections embrace the core. The shell sections are preferably fabricated to also embrace a portion of the unsupported section of the overlapping region of the transfer components.

When a single piece shell is employed, the shell may be injection molded or transfer molded about the core; however, it is preferred to cast the shell around the core. It is further preferred to also cast the shell around a portion of the unsupported section of the overlapping region of the transfer components. When a head mold is employed for casting a shell about the core, it is designed to hold the core, the transfer components, and any insulating members in the appropriate orientation in a head mold cavity. After securing the core in the head mold, the head mold cavity is filled, preferably with a liquid two-part epoxy which is designed for electrically insulating applications. After the head mold is filled with the liquid epoxy, the head mold is placed in a chamber and the pressure reduced to eliminate entrapped gas. After the epoxy has cured, the resulting rigid shell is stripped from the head mold.

When additional strength is sought in the shell and the shell is fabricated from epoxy, it is preferred for fibers such as glass fibers to be added to the shell. Preferably, these fibers are about 0.001 inches in diameter and about ⅛ inch (2 to 3 mm) long. These dimensions encourage alignment of the fibers as the epoxy is poured into the mold, while not interfering with the flow characteristics of the epoxy.

BEST MODE OF CARRYING THE INVENTION INTO PRACTICE

Figure 1:
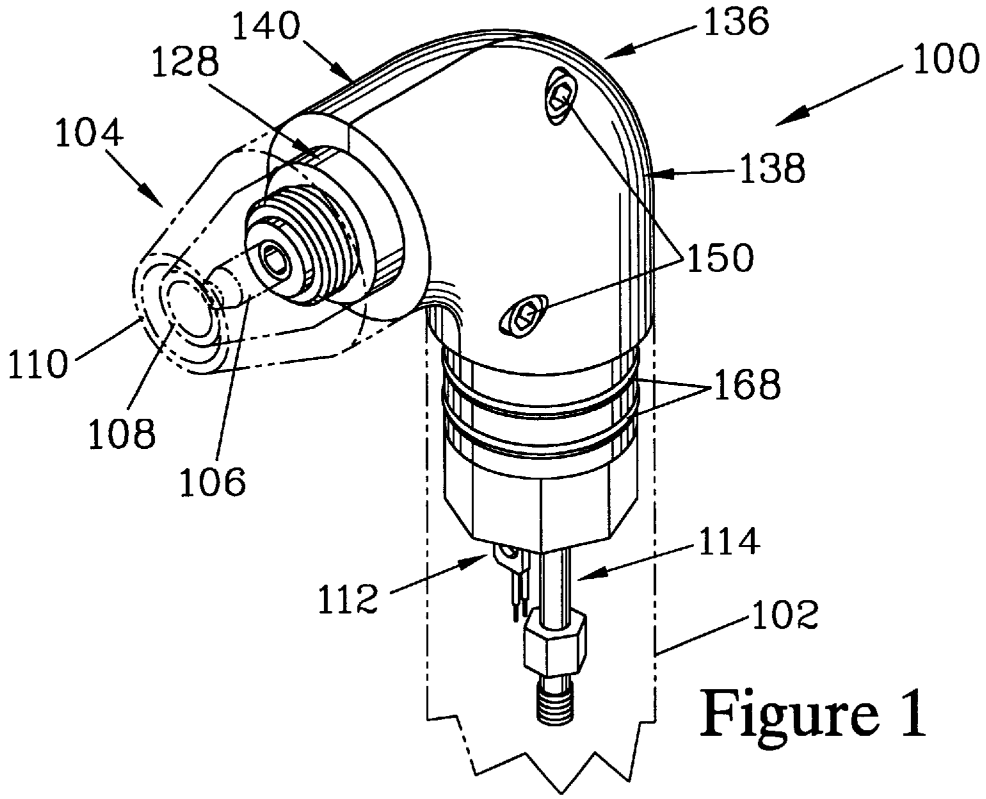
FIG. 1 is an isometric drawing of one embodiment of the torch head of the present invention. In this embodiment, the torch head has transfer components which are isolated from each other and secured in a core which is formed from an elastomer. The core and the transfer components are housed in a rigid shell which is formed in sections, which are secured around the core with bolts. In this embodiment, phenolic particles are molded to provide the shell sections.
Figure 2:
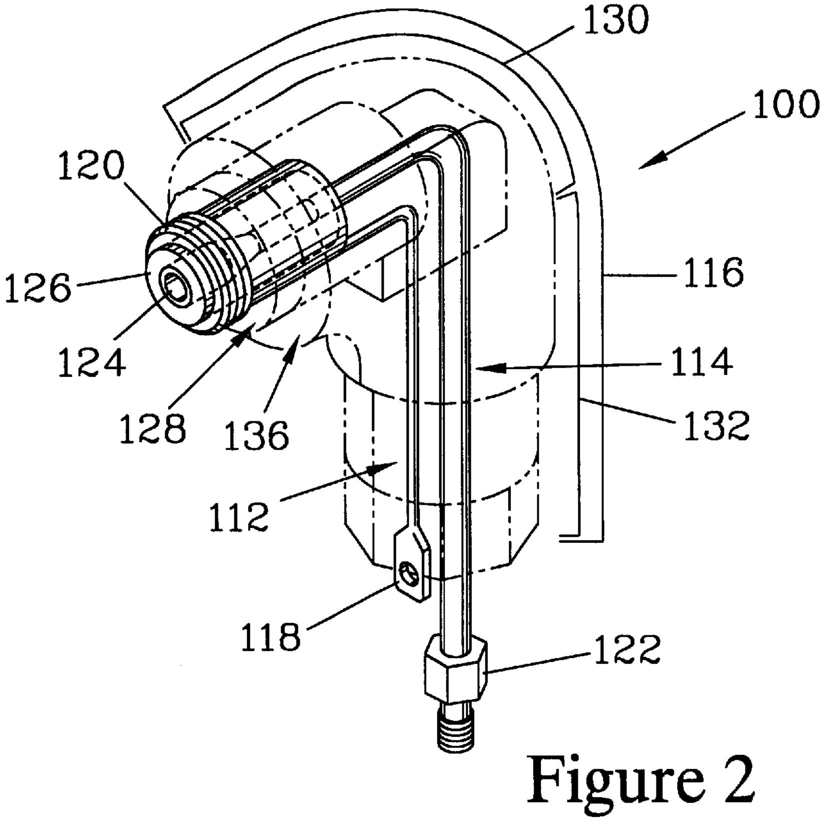
FIG. 2 is an isometric view illustrating the assembled transfer components and an insulating member of the torch head of FIG. 1, where the core and the rigid shell are shown in phantom.
Figure 3:
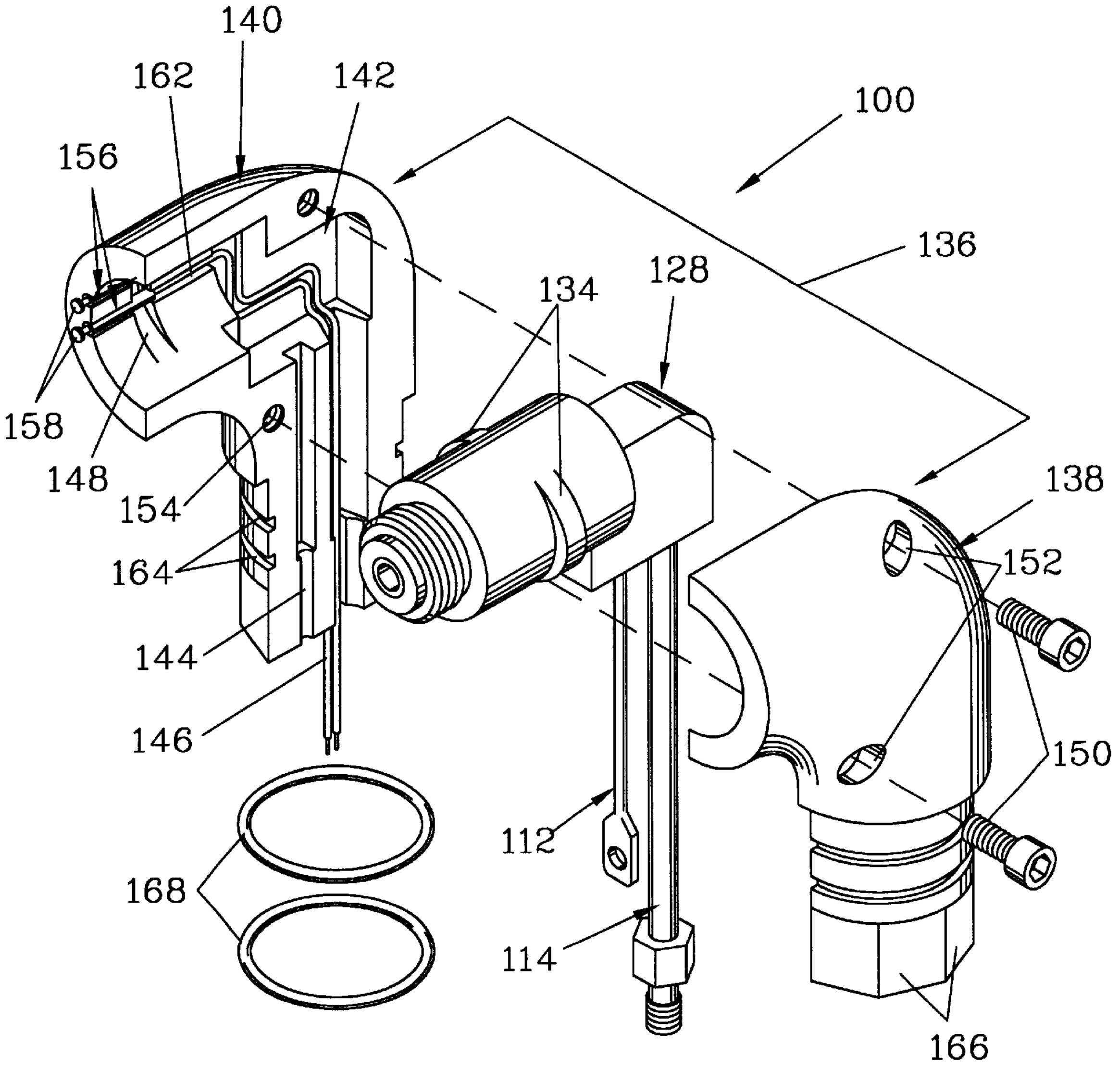
FIG. 3 is an exploded isometric view of the embodiment of FIG. 1. In addition to housing the core and transfer components, channels are provided in the shell for mounting safety switches which are closed, allowing a current to pass through the torch, when the pins are depressed. Having the shell rigid facilitates the mounting of these switches as well as providing a scuff resistant exterior to protect the torch head from abrasion and prevent any sloughed material separating from the core.

FIGS. 1 through 3 illustrate one embodiment of the present invention, a plasma torch head 100. FIG. 1 shows the plasma torch head 100 fully assembled, while FIG. 3 shows an exploded view of the plasma torch head 100. In use, the plasma torch head 100 is interposed between a torch handle 102 and a set of terminal components 104, both of which are conventional elements and are indicated in phantom in FIG. 1. The terminal components 104 include an electrode 106, a tip 108, and a shield cup 110.

The plasma torch head 100 has a HF lead 112 and a power lead/gas conduit 114 which serve to convey current and fluids from the torch handle 102 to the terminal components 104. The HF lead 112 and the power lead/gas conduit 114 serve as transfer components, and are similar to those found in conventional plasma torch heads. As best shown in FIG. 2, the HF lead 112 and the power lead/gas conduit 114 are, in part, overlapped to form an overlapping region 116. The HF lead 112 terminates in a HF lead connector 118, which allows connecting a supply of HF energy to the plasma torch head 100 for starting an arc, and a tip mounting 120, to which the tip 108 may be mounted. The power lead/gas conduit 114, which provides both working gas and power for the plasma torch head 100, terminates in a power/gas source connector 122, to which a supply of gas and electrical power may be connected, and in an electrode connector 124, which is engaged by the electrode 106 when the terminal components 104 are mounted to the plasma torch head 100. The electrode connector 124 is positioned concentrically within the tip mounting 120. An insulating sleeve 126 is interposed between the tip mounting 120 and the electrode connector 124 to assure that these two elements are electrically isolated from each other.

The plasma torch head 100 has a core 128 (best shown in FIG. 3), formed of an elastomeric material. The core 128 has embedded therein portions of the HF lead 112 and the power lead/gas conduit 114, forming a core-supported section 130 of the overlapping region 116, while leaving free an unsupported section 132 of the overlapping region 116 which extends beyond the core 128. The tip mounting 120 of the HF lead 112, the electrode connector 124 of the power lead/gas conduit 114, and the insulating sleeve 126 extend beyond the core 128 to allow the terminal components 104 to be connected to the tip mounting 120 and the electrode connector 124.

The core 128 is formed of an elastomeric material such as silicone rubber. Employing an elastomer for the core 128 allows it to expand and contract to accommodate thermal expansion and contraction. While the core 128 may be formed by wrapping the HF lead 112 and the power lead/gas conduit 114 with uncured silicone rubber and compression molding it to form the core 128 in a manner such as is described in U.S. Pat. No. 5,519,185, it is preferred that the core 128 be formed by injection of a liquid silicon rubber into an injection mold. When the core 128 is injection molded, a liquid silicone rubber material may be employed. Elastosil® LR 3001/55 and Elastosil® LR 3003/60 produced by Wacker Silicones Corp. and LIM® 6061 produced by GE Silicones are examples of liquid silicone rubbers which are suitable for forming the core 128.

The HF lead 112 and the power lead/gas conduit 114 have embedded sections residing within the core-supported section 130 of the overlapping region 116 which contact the core 128, and exposed sections residing in the unsupported section 132 of the overlapping region 116 which extend beyond the core 128. The core 128 secures the HF lead 112 and the power lead/gas conduit 114 in a spaced apart relationship. The core 128 may be formed with alignment tabs 134 which protrude slightly from the core 128.

A two-part rigid shell 136 surrounds the core 128 and a portion of the unsupported section 132 of the overlapping region 116 of the HF lead 112 and the power lead/gas conduit 114. The tip mounting 120 of the HF lead 112, the electrode connector 124 of the power lead/gas conduit 114, and the insulating sleeve 126 extend beyond the rigid shell 136 to allow the terminal components 104 to be connected to the tip mounting 120 and the electrode connector 124.

The two-part rigid shell 136 has a first shell section 138 and a second shell section 140 which, in this embodiment, are formed by molding phenolic particles such as Bakelite®. As shown in FIG. 3, the first shell section 138 and the second shell section 140 are each formed with a core engaging recess 142, a HF lead engaging groove 144, and a power lead/gas conduit engaging groove 146. When the first shell section 138 and the second shell section 140 are assembled around the core 128, the core 128 is engaged in the core engaging recess 142, which is contoured to accommodate the core 128. When the core 128 is provided with alignment tabs 134, the core engaging recess 142 is provided with corresponding tab engaging recesses 148.

The HF lead engaging groove 144 is contoured to engage a portion of the HF lead 112 which resides in the unsupported section 132 that extends beyond the core 128, and the power lead/gas conduit engaging groove 146 is contoured to engage a portion of the power lead/gas conduit 114 which resides in the unsupported section 132. The HF lead engaging groove 144 and the power lead/gas conduit engaging groove 146 aid in maintaining portions of the HF lead 112 and the power lead/gas conduit 114 which reside in the unsupported section 132 in a spaced apart relationship, as well as protecting the unsupported section 132 of the HF lead 112 and the power lead/gas conduit 114 from damage due to bending. A portion of the unsupported section 132 of the overlapping region 116 of the HF lead 112 and the power lead/gas conduit 114 extends beyond the rigid shell 136, to allow access to the HF lead connector 118 and the power/gas source connector 122.

In service, the first shell section 138 and the second shell section 140 engage the core 128 and the unsupported section 132, and are secured together by bolts 150. The bolts 150 pass through bolt passages 152 provided in the first shell section 138 and engage threaded passages 154 in the second shell section 140. The two-part rigid shell 136 protects the core 128 from abrasion and helps prevent deterioration of the core 128 by holding in position any fragments resulting from sloughing.

In this embodiment, the plasma torch head 100 is provided with a pair of safety switches 156, shown in FIG. 3, which are frequently employed in plasma torch heads. The safety switches 156 each have a plunger pin 158, which closes the switch when depressed. The safety switches 156 are positioned such that the plunger pins 158 are depressed when the terminal components 104 are securely mounted to the plasma torch head 100. When the terminal components 104 are removed from the plasma torch head 100, the plunger pins 158 are biased to positions where the safety switches 156 are open. The safety switches 156 connect to switch leads 160, which in turn are connected to a conventional safety cutoff circuit, not shown. The safety switches 156 and safety cutoff circuit assure that no power is supplied to the plasma torch head 100 when the terminal components 104 are either not mounted or not secured.

To facilitate installation of the safety switches 156, the second shell section 140 is provided with a pair of switch channels 162, in which the safety switches 156 may be placed prior to securing the first shell section 138 and the second shell section 140 together about the core 128. By mounting the safety switches 156 in the rigid shell 136, the position of the safety switches 156 is rigidly maintained. It should be noted that when the core 128 is provided with alignment tabs 134, the alignment tabs 134 can be notched to avoid interference with the safety switches 156 when the first shell section 138 and the second shell section 140 are assembled about the core 128.

To facilitate mounting of the plasma torch head 100 to the torch handle 102, the first shell section 138 and the second shell section 140 are preferably formed with one or more O-ring accepting grooves 164 and facets 166. The O-ring accepting grooves 164 facilitate placing O-rings 168 around the rigid shell 136 to provide a sealed mounting of the torch handle 102 to the plasma torch head 100 in the manner known in the art. The facets 166 facilitate gripping the rigid shell 136 by the torch handle 102 when torsional loads are applied to the plasma torch head 100 while the torch is in use.

Figure 4:
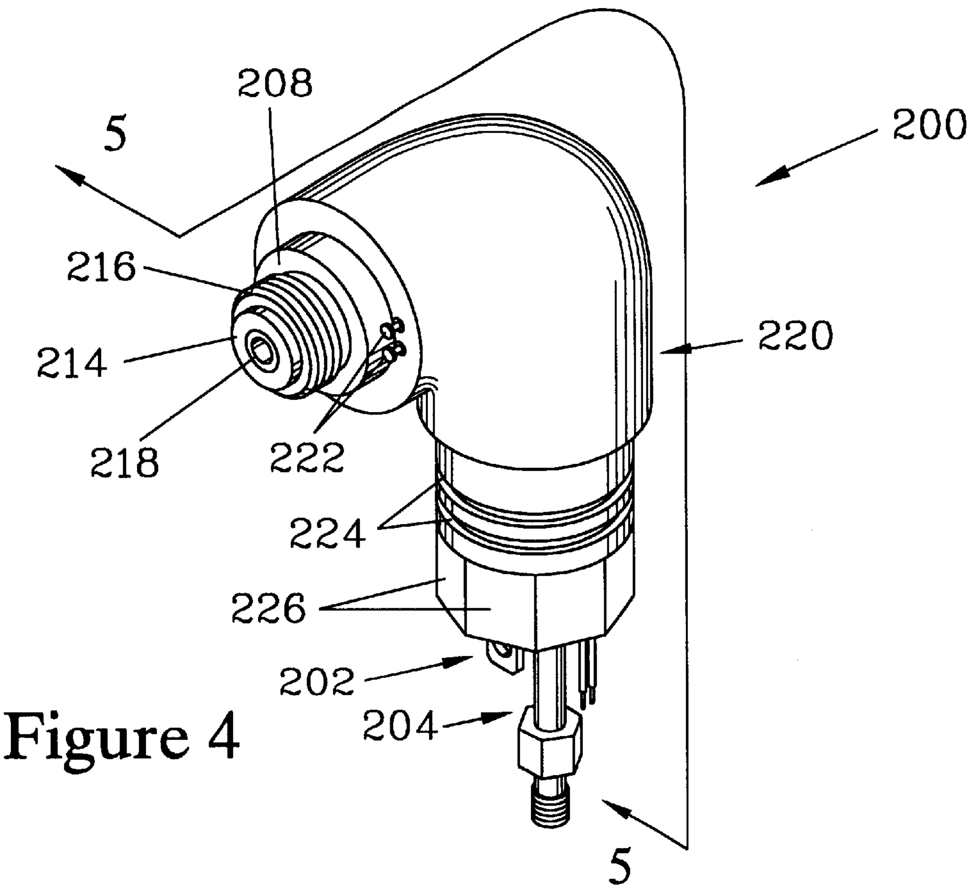
FIG. 4 is an isometric view of another embodiment of the present invention which is similar to the embodiment of FIGS. 1–3, but which employs a continuous shell. An epoxy resin is cast about the core and portions of the unsupported section of the transfer components to form a single, continuous shell.
Figure 5:
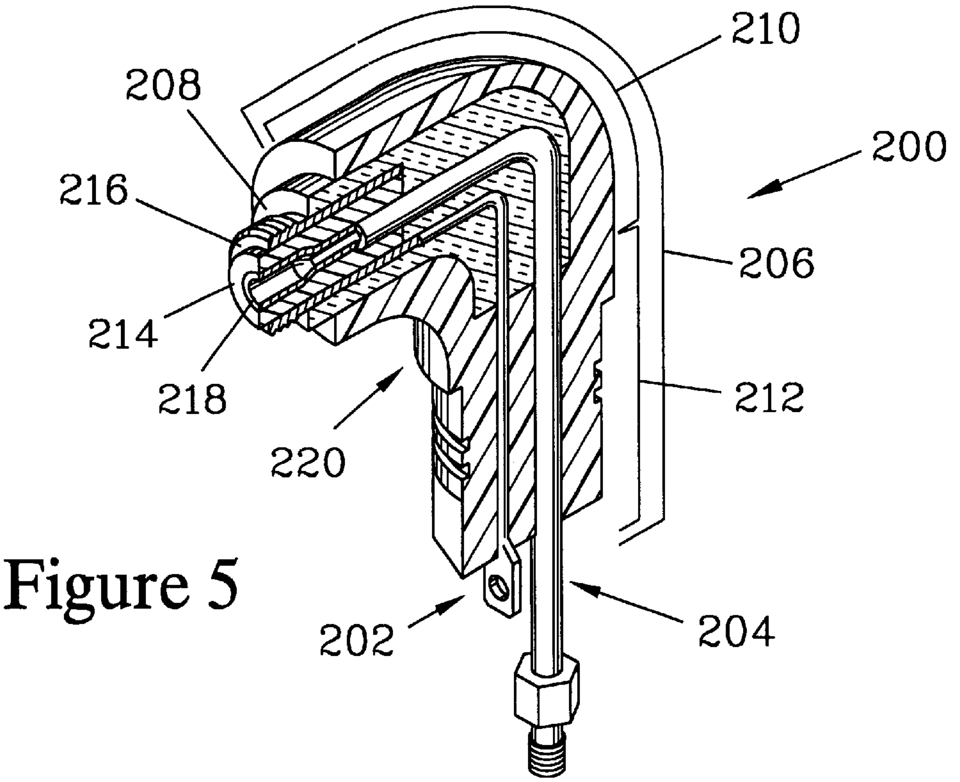
FIG. 5 is an isometric view of the section 5—5 of FIG. 4, which further illustrates the path of the transfer components through both the shell and the core of the torch head.

FIGS. 4 and 5 illustrate another embodiment of the present invention, a plasma torch head 200. The plasma torch head 200 again has a HF lead 202 and a power lead/gas conduit 204, portions of which overlap, forming an overlapping region 206 (shown in FIG. 5). A core 208 is again formed of an elastomeric material, and a core-supported section 210 of the overlapping region 206 of the HF lead 202 and the power lead/gas conduit 204 is embedded in the core 208. Again, an unsupported section 212 of the overlapping region 206 extends beyond the core 208. The core 208 is preferably formed of silicone rubber, and it is preferred for the core 208 to be molded from a liquid silicone rubber.

As can best be seen in the section view of FIG. 5, an insulating sleeve 214 is again interposed between a tip mounting 216 of the HF lead 202 and an electrode connector 218 of the power lead/gas conduit 204. A portion of the insulating sleeve 214 is embedded in the core 208.

A rigid shell 220 surrounds the core 208 and a portion of the unsupported section 212 of the overlapping region 206 of the HF lead 202 and the power lead/gas conduit 204. The rigid shell 220 employed in this embodiment is a one-piece rigid shell 220 which is cast around a portion of the core 208 and a portion of the unsupported section 212 of the overlapping region 206 of the HF lead 202 and the power lead/gas conduit 204. Having a portion of the unsupported section 212 of the overlapping region 206 embedded in the rigid shell 220 provides rigid support for the unsupported region 212 of the overlapping regions 206 of the HF lead 202 and the power lead/gas conduit 204.

While the one-piece shell 220 could be fabricated by molding a phenolic material such as Bakelite® around the core 208, the HF lead 202 and the power lead/gas conduit 204, the success of such technique depends, in part, on the compressibility and symmetry of the core 208. Thus, it is preferred that the rigid shell 220 is fabricated by casting a two-part epoxy mixture, and more preferably an epoxy mixture employing a low viscosity, filled resin. Camattini S.P.A's MC 35 epoxy resin mixed with either K63 or W07 hardener is an example of an epoxy which is suitable for casting the rigid shell 220. The epoxy is preferably filled with 10–30% by volume of glass fibers approximately 0.001" in diameter and 0.1251" long.

As shown in FIG. 4, the plasma torch head 200 includes safety switches 222. The safety switches 222 are attached to the core 208 at the desired location prior to casting the rigid shell 220. The rigid shell 220 is again preferably formed with one or more O-ring accepting grooves 224 and several facets 226.

Figure 6:
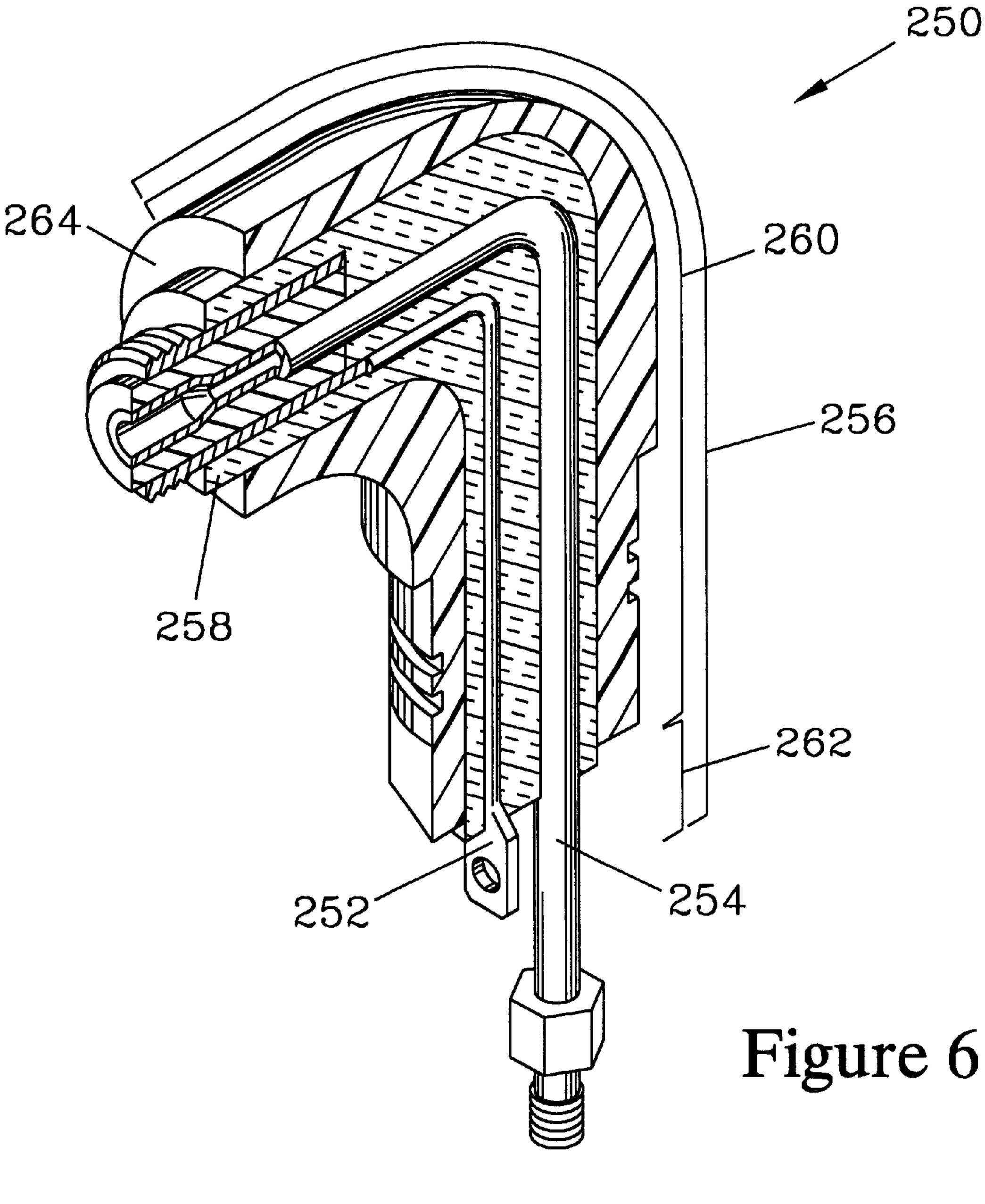
FIG. 6 is a section view of an embodiment which shares many features in common with the embodiment shown in FIGS. 4 and 5. In this embodiment, the core extends over most of the overlapped region of the transfer components.

FIG. 6 illustrate another embodiment of the present invention, a plasma torch head 250, which shares many features in common with the plasma torch head 200 discussed above. The plasma torch head 250 again has a HF lead 252 and a power lead/gas conduit 254, portions of which overlap, forming an overlapping region 256.

A core 258 is again formed of an elastomeric material. A portion of the overlapping region 256 of the HF lead 252 and the power lead/gas conduit 254 is embedded in the core 258, forming a core-supported section 260 of the overlapping region 256 which is embedded in the core 258, and leaving an unsupported section 262 of the overlapping region 256 which extends beyond the core 258. The core 258 is again preferably formed of silicone rubber, and more preferably molded from liquid silicone rubber.

In this embodiment, the core 258 extends such that the core-supported section 260 forms most of the overlapping region 256 of the HF lead 252 and the power lead/gas conduit 254, the unsupported section 262 being just sufficient to allow the user to access the HF lead 252 and the power lead/gas conduit 254.

A rigid shell 264 surrounds the core 258. The rigid shell 264 is again a one-piece construction which is fabricated by casting. A portion of the core 258 is embedded in the rigid shell 264, but in this embodiment the rigid shell 264 does not engage the unsupported section 262 of the overlapping region 256 of the HF lead 252 and the power lead/gas conduit 254. The rigid shell 264 is again preferably formed by casting a two-part epoxy mixture. In this embodiment, the support of the overlapping region 256 of the HF lead 252 and the power lead/gas conduit 254 is provided by the core 258 and the support provided to the core 258 by the rigid shell 264.

The torch heads of the present invention can be fabricated by a variety of techniques. All of these techniques have in common that the transfer components, as well as any associated insulating element of the torch head, are first positioned in the appropriate configuration for the resulting torch head. Portions of the transfer components overlap, forming an overlapping region of the transfer components.

Thereafter, a section of the overlapping region of the transfer components and a section of any associated insulator are embedded in a core element which is fabricated from an elastomer. The elastomer is preferably a silicone rubber, in which case there are a variety of techniques by which the core can be formed. A compression mold can be used, into which silicone rubber strips which surround a core-supported section of the overlapping region of the transfer components and any associated insulator elements are placed, with the transfer components and the associated insulator appropriately positioned therein. The rubber strips are heated and the mold closed to subject the rubber strips to both temperature and pressure to mold and vulcanize the rubber strips into a core of the desired shape. The core is then cured in the mold before being released from the mold. Such techniques for forming bonded silicone rubber strips are taught in the '185 patent. After the core is formed, it is surrounded by a rigid shell.

Figure 7:
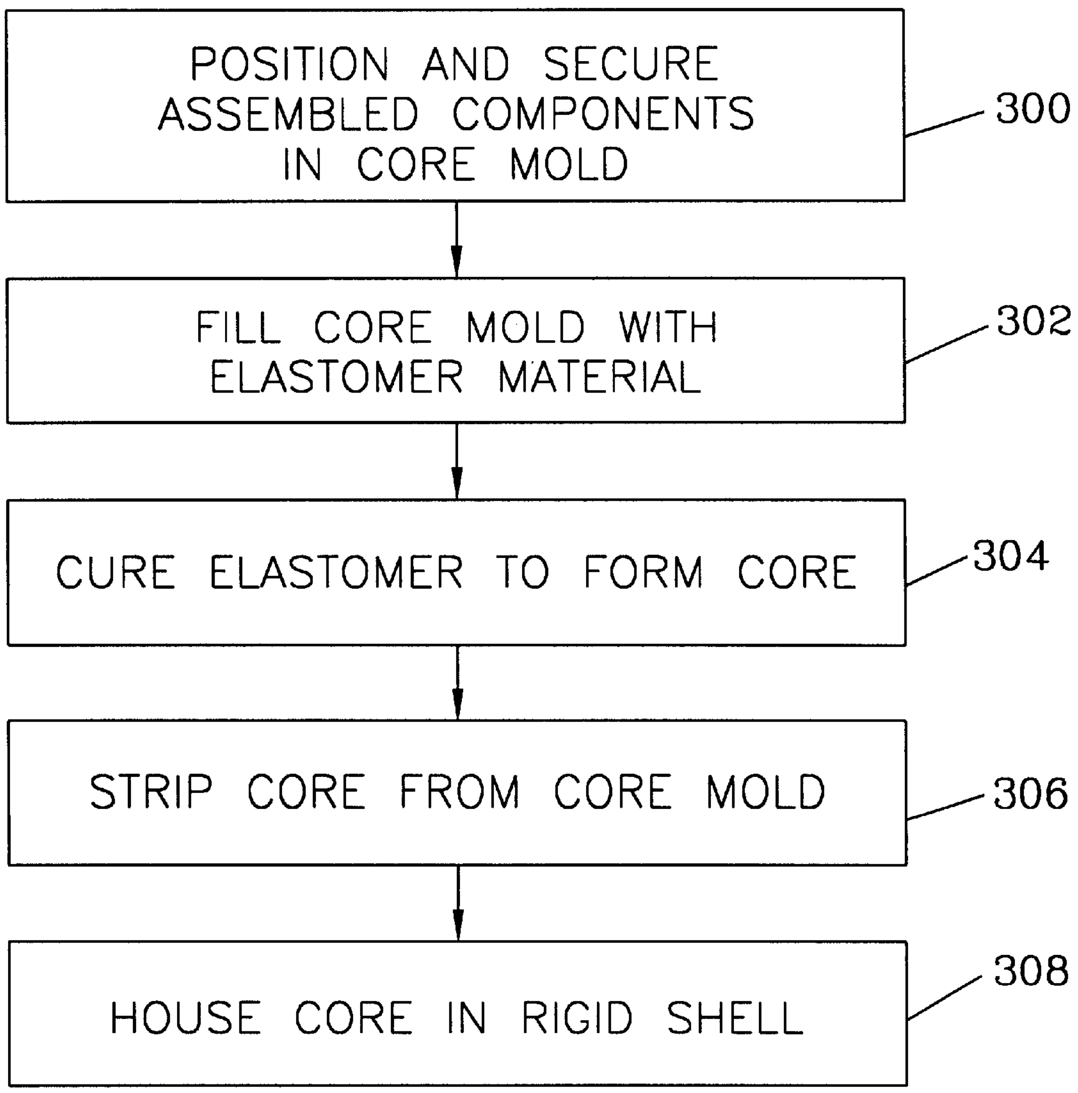
FIG. 7 is a diagram depicting the steps which are employed in a preferred method of fabricating the torch head of the present invention.

FIG. 7 illustrates the steps of a preferred method for forming plasma torch heads of the present invention. In this method, the core is formed by molding a liquid elastomer.

The method is initiated, as indicated in step 300, by assembling transfer components and any associated insulator with respect to each other, and positioning the transfer components in a core mold which is configured to engage portions of the transfer components which are to extend beyond the core when the core mold is closed. The core mold serves to secure the transfer components in position in the closed mold.

In step 302, the core mold is filled with the elastomer material. To simplify fabrication and to assure a fully dense core without knit lines and voids, it is preferred that the elastomer be liquid moldable silicone rubber such as Elastosil® LR 3001/55 and Elastosil® LR3003/60 produced by Wacker Silicones Corp. and LIM® 6061 produced by GE Silicones. The preferred silicone rubbers are those which can readily withstand the temperatures to which the torch heads are exposed in service.

After filling the mold with the elastomer, the core mold is maintained under a temperature and pressure for sufficient time to cure the elastomer, as indicated in step 304. It has been found that generally the preferred silicone rubbers require a curing temperature of 350° F.–410° F. for 10–40 seconds to cure, the curing time depending on the thickness of the core.

After the core has been cured, it is stripped from the mold in step 306. The resulting core may resemble the core 128 as shown in FIG. 3, with an unsupported section of the overlapping region of the transfer components extending beyond the core, or may be configured so as to embed most of the overlapping region of the transfer components, resembling the core 258 shown in FIG. 6. The extent of the core is typically limited to only a portion of the overlapping region of the transfer components, allowing the rigid shell to support a portion of the transfer components for increased rigidity.

To form the torch head of the present invention, a rigid shell is formed about the elastomer core, in step 308. The rigid shell can be a multi-part shell or a single piece shell, and preferred methods of forming each are discussed in greater detail below. The shell preferably also surrounds a portion of the unsupported section of the overlapping region of the transfer components, leaving a portion free to allow access to the transfer components.

Figure 8:
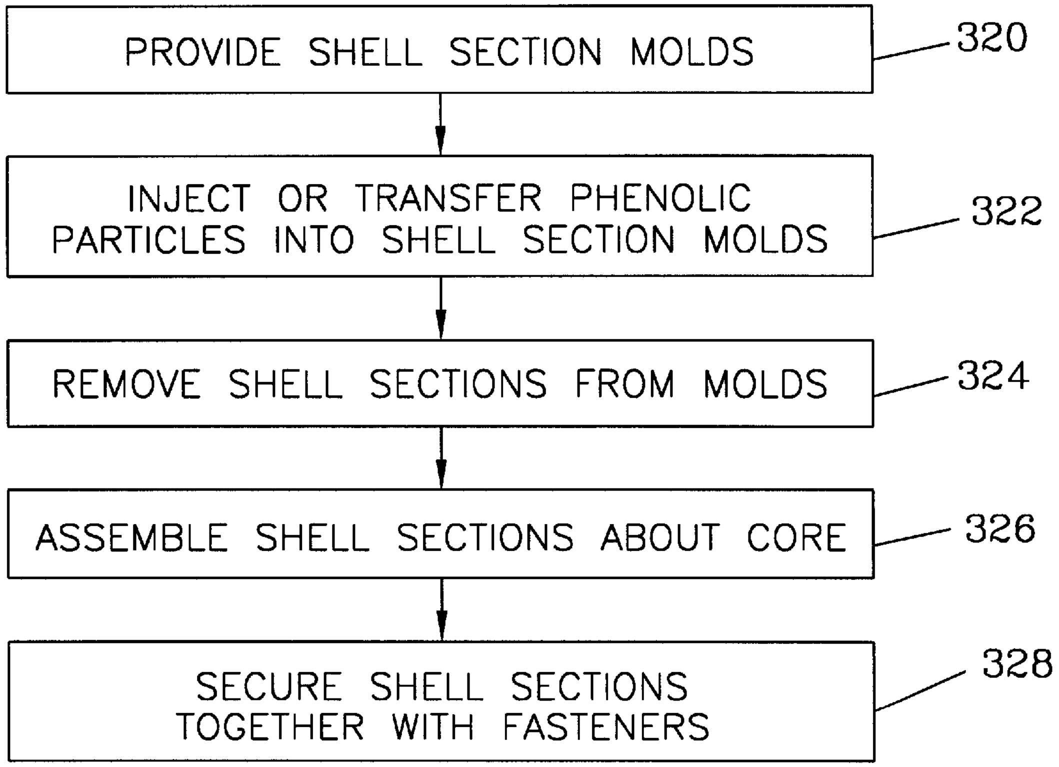
FIG. 8 is a diagram showing steps for one preferred method of forming the shell about the core, to provide the embodiment shown in FIGS. 1–3.

FIG. 8 shows the steps of a preferred method for forming a rigid multi-part shell about the elastomer core, to provide a plasma torch head such as the plasma torch head 100 shown in FIGS. 1–3. The fabrication of the multi-part shell is initiated by providing shell section molds 320. Next, in step 322, the shell section molds are filled with phenolic particles such as Bakelite®, either by injection molding or transfer molding techniques, and cured to form the shell sections. The shell sections are then removed from the shell section molds, as indicated in step 324.

If safety switches are to be employed, such can be affixed to one of the shell sections at this point. Preferably, one of the shell sections is configured to provide switch channels such as the switch channels 154 shown in FIG. 3. The safety switches may then be secured in the switch channels prior to placing the shell sections about the core.

The shell sections are assembled about the core in step 326. The shell sections are configured to tightly embrace the core and remain in engagement with the core when fitted thereover. Preferably, the shell sections are also configured to surround and engage a portion of the unsupported section of the overlapping region of the transfer components. Once the shell sections are positioned about the core, the shell sections, as indicated in step 328, are secured together with fasteners such as the bolts 150 shown in FIGS. 1 and 3.

Figure 9:
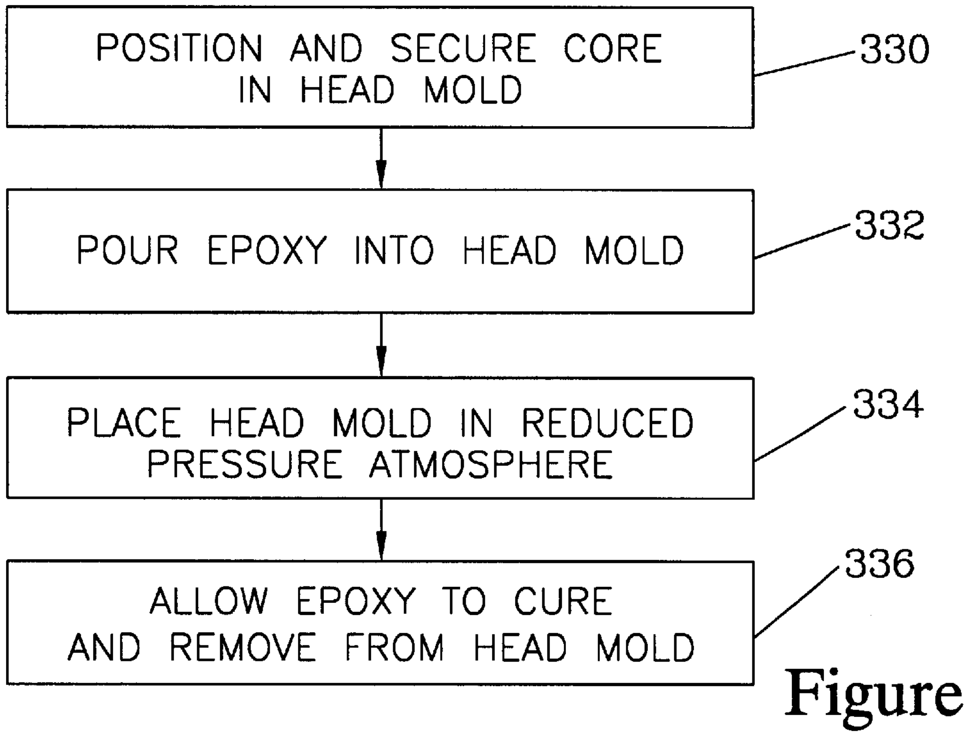
FIG. 9 is a diagram showing steps for a second preferred method of forming the shell about the core, to provide an embodiment such as those shown in FIGS. 4–6.

FIG. 9 shows the steps of a preferred method for forming a single piece rigid shell such as the shell 220 employed in the plasma torch head 200 shown in FIGS. 4 and 5, or the shell 264 of the embodiment shown in FIG. 6. In this method, as indicated in step 330, the core, the transfer components, and any associated insulators are positioned in the cavity of a head mold. The head mold is then closed to secure the core and the transfer elements therein. The head mold is configured to engage portions of the core, the transfer components, or both to secure them in position.

If safety switches are to be employed, such are affixed with respect to the core prior to positioning the core in the head mold.

Once the core and the transfer elements are secured, a two-part epoxy is prepared and poured into the head mold in step 332. Preferably, a low viscosity filled resin is employed, and mixed with an appropriate hardener. An example of an epoxy and hardeners which are suitable are Camattini S.P.A's MC 35 epoxy resin mixed with K63 or W07 hardener. The epoxy is preferably filled with glass fibers, such fibers being preferably about 0.001" in diameter and less than about 0.125" long. Preferably about 10–30% by volume of such glass fibers are added into the epoxy. After mixing the epoxy and hardener, the mold is filled to the desired level with the mixture, leaving portions of the transfer components free for connection when the plasma torch head is connected to a torch handle and to a set of terminal components.

Once the mold has been filled to the desired level, the mold is placed in a chamber where the pressure is reduced to degas the epoxy mixture before it reacts to form a solid, as indicated in step 334. In step 336, the epoxy shell is allowed to cure and then is removed from the head mold.

While the novel features of the present invention have been described in terms of particular embodiments and preferred applications, it should be appreciated by one skilled in the art that substitution of materials and modification of details obviously can be made without departing from the spirit of the invention.

What I claim is:

1. A plasma torch head comprising:

transfer components for transport of electrical currents and fluid, said transfer components overlapping in part, forming an overlapping region of said transfer components;

a core in which a core-supported section of said overlapping region of said transfer components is embedded, said core being fabricated from an elastomer so as to be soft and yielding to accommodate thermal expansion and contraction of said transfer components; and a shell being a hard material configured to engage and house said core.

2. The torch head of claim 1 wherein said core is configured to leave an unsupported section of said overlapping region of said transfer components, and further wherein said shell supportably engages said unsupported section of said overlapping region of said transfer components.

3. The torch head of claim 2 wherein said shell is a multi-part shell which further comprises:

a first shell section;

a second shell section configured to engage said first shell section; and fastening means for affixing said first shell section to said second shell section while encasing said core.

4. The torch head of claim 3 wherein said elastomer is silicone rubber.

5. The torch head of claim 4 wherein said rigid material is selected from the group of polymers consisting essentially of phenolic molding materials and two-part epoxies.

6. The torch head of claim 2 wherein said shell is a single piece shell.

7. The torch head of claim 6 wherein said elastomer is silicone rubber.

8. The torch head of claim 7 wherein said rigid material is a two-part castable epoxy.

9. The torch head of claim 8 wherein said two-part castable epoxy includes 10–30% by volume of glass fibers.

10. The torch head of claim 2 further comprising:

at least one safety switch mounted in said shell.

11. The torch head of claim 1 wherein said shell is a multi-part shell which further comprises:

a first shell section;

a second shell section configured to engage said first shell section; and fastening means for affixing said first shell section to said second shell section while encasing said core.

12. The torch head of claim 1 wherein said shell is a single piece shell.

13. A method for forming a head of a plasma torch, the torch head having transfer components for transferring fluids and electric currents, the method comprising the steps of:

assembling the transfer components of the torch head with respect to each other;

positioning and securing the assembled transfer components in a core mold;

filling the core mold with an elastomer;

curing the elastomer in the core mold, forming an elastic core;

stripping the elastic core from the core mold; and forming a shell of a rigid material about the elastic core.

14. The method of claim 13 wherein the elastic core is configured to provide a core-supported section of the assembled transfer components while leaving free an unsupported section of the assembled transfer components, further wherein said step of forming a shell about the elastic core also includes forming the shell about the unsupported section of the assembled transfer components.

15. The method of claim 14 wherein said step of forming a shell of a rigid material about said elastic core further comprises the steps of:

providing shell section molds;

filling the shell section molds under pressure with phenolic particles and curing the phenolic particles to form shell sections;

removing the shell sections from the molds;

assembling the shell sections about the elastic core and the unsupported section of the assembled transfer components; and securing the shell sections together with fasteners.

16. The method of claim 15 further comprising:

attaching at least one safety switch to at least one of the shell sections prior to said step of assembling the shell sections about the elastic core.

17. The method of claim 14 wherein said step of forming a shell of a rigid material about the elastic core further comprises the steps of:

positioning and securing the elastic core in a head mold;

pouring a two part epoxy into the head mold;

placing the head mold in a reduced pressure atmosphere;

allowing sufficient time for the epoxy to cure; and stripping the cured epoxy from the head mold.

18. The method of claim 17 further comprising:

affixing at least one safety switch with respect to the elastomer core prior to said step of pouring a two part epoxy into the head mold.

19. The method of claim 13 wherein said step of forming a shell of a rigid material about the elastic core further comprises the steps of:

providing shell section injection molds;

filling the shell section molds under pressure with phenolic particles and curing the phenolic particles to form shell sections;

removing the shell sections from the shell section molds;

assembling the shell sections about the elastic core; and securing the shell sections together with fasteners.

20. The method of claim 13 wherein said step of forming a shell of a rigid material about the elastic core further comprises the steps of:

positioning and securing the elastic core in a head mold;

pouring a two part epoxy into the head mold;

placing the head mold in a reduced pressure atmosphere;

allowing sufficient time for the epoxy to cure; and stripping the cured epoxy from the head mold.

21. A plasma torch head comprising:

transfer components for transport of electrical currents and fluid, said transfer components being spaced apart and overlapping in part, forming an overlapping region of said transfer components;

a core in which a core-supported section of said overlapping region of said transfer components is embedded, said core being fabricated from an elastomer so as to be soft and yielding to accommodate thermal expansion and contraction of said transfer components; and a shell being hard cast material, said shell engaging and housing said core.

22. The torch head of claim 21 wherein said core is configured to leave an unsupported section of said overlapping region of said transfer components, and further wherein said shell supportably engages said transfer components in said unsupported section of said overlapping region of said transfer components.

23. The torch head of claim 22 wherein said shell is a single piece shell.

24. The torch head of claim 22 wherein said shell is a multi-part shell which further comprises:

a first shell section;

a second shell section configured to engage said first shell section; and fastening means for affixing said first shell section to said second shell section while encasing said core.

25. A plasma torch head comprising:

transfer components for transport of electrical currents and fluid, said transfer components being spaced apart and overlapping in part, forming an overlapping region of said transfer components;

a core in which a core-supported section of said overlapping region of said transfer components is embedded, said core being fabricated from an elastomer so as to be soft and yielding to accommodate thermal expansion and contraction of said transfer components; and a shell molded of a hard material, said shell engaging and housing said core.

26. The torch head of claim 25 wherein said core is configured to leave an unsupported section of said overlapping region of said transfer components, and further wherein said shell supportably engages said transfer components in said unsupported section of said overlapping region of said transfer components.

27. The torch head of claim 26 wherein said shell is a single piece shell.

28. The torch head of claim 26 wherein said shell is a multi-part shell which further comprises:

a first shell section;

a second shell section configured to engage said first shell section; and fastening means for affixing said first shell section to said second shell section while encasing said core.

* * * * *